United States Patent [19]
Kishimoto et al.

[11] Patent Number: 5,130,886
[45] Date of Patent: Jul. 14, 1992

[54] ELECTRICALLY CONDUCTING POLYMER, METHOD FOR PREPARING THE SAME AND ELECTROLYTIC CAPACITOR COMPRISING THE SAME

[75] Inventors: Yoshio Kishimoto, Hirakata; Mamoru Soga, Osaka; Nobuo Sonoda, Settsu, all of Japan

[73] Assignee: Matsushita Electric Industrial Co., Ltd., Osaka, Japan

[21] Appl. No.: 758,196

[22] Filed: Sep. 11, 1991

Related U.S. Application Data

[63] Continuation of Ser. No. 552,692, Jul. 12, 1990.

[30] Foreign Application Priority Data

Jul. 19, 1989 [JP] Japan .................................. 1-186480
Jul. 25, 1989 [JP] Japan .................................. 1-192962
Jan. 29, 1990 [JP] Japan .................................. 2-018309

[51] Int. Cl.$^5$ ............................ H01G 9/02; H01B 1/00
[52] U.S. Cl. ............................................ 361/525; 252/500
[58] Field of Search ................... 361/323, 523–527; 29/25, 42, 25.03; 252/500, 162.2

[56] References Cited

U.S. PATENT DOCUMENTS 4,803,596 2/1989 Hellwig et al. ................... 361/525
4,858,078 8/1989 Morimoto et al. .................. 361/527
4,983,690 1/1991 Cameron et al. ............... 252/500 X

FOREIGN PATENT DOCUMENTS 0104726 4/1984 European Pat. Off.
0135223 3/1985 European Pat. Off.
0167798 1/1986 European Pat. Off.
0269090 6/1988 European Pat. Off.

OTHER PUBLICATIONS

Patent Abst. Of Japan 14 (255) (E-935) [4198] May 31, 1990.

*Primary Examiner*—Donald A. Griffin
*Attorney, Agent, or Firm*—Wenderoth, Lind & Ponack

[57] ABSTRACT

An electrically conducting polymer composition which comprises an electron conjugated polymer and at least one stationary dopant which is selected from the group consisting of consisting of an oligomer having ionic groups with an average degree of oligomerization of 3 to 12 and ionic group-bonded particles which have an average particle size of 0.01 to 1 μm and to at least surfaces of which ionic groups are bonded through covalent bonds, and which is dispersed in said electron conjugated polymer, which polymer composition provides an electrolytic capacitor having good frequency characteristics and long-term stability.

13 Claims, 1 Drawing Sheet

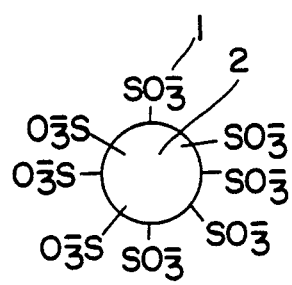
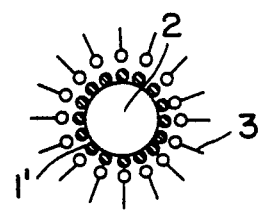
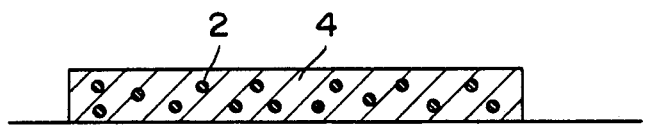
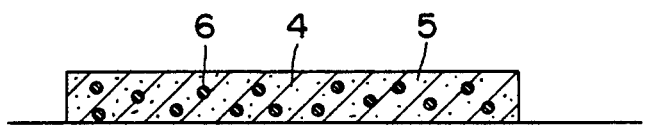
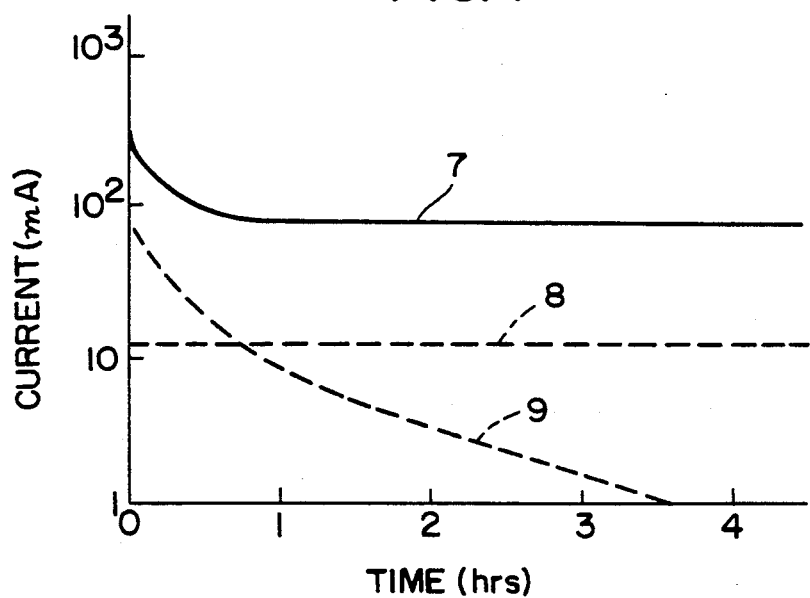

ELECTRICALLY CONDUCTING POLYMER, METHOD FOR PREPARING THE SAME AND ELECTROLYTIC CAPACITOR COMPRISING THE SAME

This application is a continuation of now abandoned application, Ser. No. 07/552,692, filed July 12, 1990.

BACKGROUND OF THE INVENTION

1. Field of the Invention

The present invention relates to an electrically conducting polymer, a method for preparing the same and an electrolytic capacitor comprising the same which has improved frequency characteristics and long-time stability.

2. Description of the Related Art

An electrically conducting polymer is a polymer having a widely spread conjugated $\pi$ electron system such as polypyrrole, polythiophene, polyaniline, polyacene and the like and has good electrical conductivity when the polymer contains an electron-donor or an electron-acceptor (e.g. an anion of Lewis acids or protonic acids) as a dopant. However, the conventional dopants have a drawback that the molecules of the dopant diffuse in the polymer matrix due to application of an electric field so that a conductivity of the electrically conducting polymer is decreased.

In view of this drawback of the dopant, it is proposed to use, as a dopant, a compound having a larger molecular weight such as phthalocyaninetetrasulfonic aid and polystyrenesulfonic acid (cf. K. Okabayashi, J. Chem. Sci., Chem. Commun., 684 (1983) and N. Bates et al, J. Chem. Sci., Chem. Commun., 871 (1985)). However, these compounds are bulky, conductivity of the polymer containing them is not so high as the polymer containing the low molecular weight dopant.

As described above, when the low molecular weight dopant is used, the electrically conducting polymer has higher conductivity although the molecules of dopant move in the polymer matrix under the application of direct current electric field, whereby the conductivity in the polymer may have very large irregularity in its distribution. On the other hand, when the bulky dopant is used, the conductivity of the conducting polymer cannot be made high. When such electrically conducting polymer is used in an electrolytic capacitor, impedance in pores at a surface of a dielectric layer cannot be kept low for a long time, and one of the advantages of the electrolytic capacitor comprising the electrically conducting polymer, namely good frequency characteristics, is deteriorated.

SUMMARY OF THE INVENTION

One object of the present invention is to provide a novel electrically conducting polymer composition with a high conductivity which is not deteriorated even in a direct current electric field.

Another object of the present invention is to provide a method for preparing a novel electrically conducting polymer composition of the present invention.

A further object of the present invention is to provide an electrolytic capacitor comprising a novel electrically conducting polymer composition of the present invention, in which impedance on a porous surface of an anode can be stably kept low for a long time and which has good frequency characteristics and long-time stability.

According to the first aspect of the present invention, there is provided an electrically conducting polymer composition which comprises an electron conjugated polymer and at least one stationary dopant which is selected from the group consisting of an oligomer having ionic groups with an average degree of oligomerization of 3 to 12 and ionic group-bonded particles which have o an average particle size of 0.01 to 1 $\mu$m and to at least surfaces of which ionic groups are bonded through covalent bonds, and which is dispersed in said electron conjugated polymer.

The electrically conducting polymer composition may further comprises a movable dopant.

According to the second aspect of the present invention, there is provided a method for preparing the electrically conducting polymer composition of the present invention, which method comprises steps of dispersing anionic group-bonded particles in a solution containing an electron conjugated monomer and optionally a salt which functions as a movable dopant and has a molecular weight of not larger than 200, and applying an electric field between at least one pair of electrodes immersed in said solution to electrolytically polymerize said electron conjugated monomer on an anode.

According to the third aspect of the present invention, there is provided a capacitor comprising a metal anode, an oxide dielectric layer on said metal anode, an electrolytic conductor layer which is formed from a novel electrically conducting polymer of the present invention and is present on said oxide dielectric layer and a cathode on said electrolytic conductor.

When molecules of the oligomer having ionic groups and an average degree of oligomerization of 3 to 12 are dispersed as the stationary dopant in the electron conjugated polymer, they cannot move easily in the electron conjugated polymer since they are bulky molecules. Therefore, the polymer composition has stable conductivity for a long time even in the direct current electric field.

Since the ionic group-bonded particles which have an average particle size of 0.01 to 1 $\mu$m and to surfaces of which ionic groups are bonded through covalent bonds are bulky in comparison with the sizes of molecules, when they are dispersed as the stationary dopant in the electron conjugated polymer, they do not have much influences on a molecular coagulated structure of the polymer so that they can impart good conductivity to the polymer composition and the imparted conductivity is not deteriorated as time passes under the direct current electric field.

In the electrically conductive polymer composition of the present invention comprising the electron conjugated polymer in which both the stationary dopant and the movable dopant are dispersed, since the stationary dopant is bulky, it may not achieve high conductivity but it may generate micropores in the electron conjugated polymer matrix near the stationary dopant so that the low molecular weight movable dopant can easily penetrate into the electron conjugated polymer matrix. Thereby, the conductivity of the polymer composition becomes very high.

The electrically conducting polymer composition of the present invention is very effective when it is used to form a dense layer having high conductivity on the porous dielectric material having a large surface area, such as the electrolytic conducting layer in the electrolytic capacitor. The conductivity $\sigma$ of the layer of electrically conducting polymer composition which acts as the electrolytic conductor is preferably high both near the surface of a porous alumina layer and inside the electrolytic conductor layer, whereby the frequency characteristics are greatly improved. Since a capacity C of the capacitor is defined by $$C = \epsilon S^*/d$$

wherein $\epsilon$ is a dielectric constant, and $S^*$ and d are an effective surface area and a thickness of the dielectric layer, respectively, it is preferably that the conductivity of the conducting polymer composition near the porous surface of the dielectric material is larger than that of the bulk. When the movable dopant is used, a layer having a larger conductivity is formed near the surface of the dielectric layer having the large surface area since the movable dopant is migrated to said surface under the application of direct current electric field. In such case, the stationary bulky dopant does not migrate and remains in the electrically conducting polymer matrix, so that the conductivity of the electrically conducting polymer layer does not significantly decrease.

BRIEF DESCRIPTION OF THE DRAWINGS

FIG. 1A schematically illustrates one example of an ionic group-bonded particle, FIG. 1B schematically illustrates an anionic group-bonded particle which has been treated with a cationic surfactant, FIG. 2 is a schematic cross sectional view of one embodiment of the electrically conductive polymer composition containing the ionic group-bonded particles dispersed therein according to the present invention, FIG. 3 is a schematic cross sectional view of another embodiment of the electrically conductive polymer composition containing the ionic group-bonded particles and the movable dopant, and FIG. 4 is a graph showing the changes of current through the polymer compositions prepared in Example 5.

DETAILED DESCRIPTION OF THE INVENTION

The electrically conducting polymer composition of the present invention comprises the electron conjugated polymer and the stationary dopant which is dispersed in the electron conjugated polymer and selected from the group consisting of an oligomer having ionic groups and an average degree of oligomerization of 3 to 12 and ionic group-bonded particles which have an average particle size of 0.01 to 1 $\mu$m and to at least surfaces of which ionic groups are bonded through covalent bonds. The electrically conducting polymer composition of the present invention preferably has a conductivity of $10^{-3}$ S/cm or larger.

The electrically conductive polymer composition of the present invention may further comprise a movable low molecular weight dopant. When the movable dopant is contained in the polymer composition, a ratio of ion concentrations of the stationary dopant to the movable dopant is 100:0.1 to 100:30 by weight, and the total dopant ion concentration in the polymer composition is not more than 10% by weight.

Preferred examples of the ionic group to be bonded to the particles are a sulfonic acid group, an hydroxybenzoic acid group and the like. Such ionic group act as a dopant for the electron conjugated polymer and greatly increases the number of carriers and, in turn, the conductivity of the polymer composition.

Preferred examples of the oligomer having the sulfonic acid group are a polycondensate of toluenesulfonic acid and aldehyde, a polycondensate of benzenesulfonic acid and aldehyde, polystyrenesulfonic acid, as well as polyphenylenesulfide, polysulfone or polyphenylene oxide which has sulfonic acid groups at both chain ends and an average degree of oligomerization of 3 to 12.

Preferred examples of the oligomer having the hydroxybenzoic acid group are a polycondensate of p-hydroxybenzoic acid and aldehyde, a polycondensate of salicylic acid and the like.

The oligomer which is used according to the present invention has an average degree of oligomerization of 3 to 12. When the average degree of oligomerization is less than 3, the material behaves like a monomer. When said average degree is larger than 12, the oligomer behaves like a high molecular weight polymer so that it may have adverse influences on the compatibility with the electron conjugated polymer or coagulation properties of the electron conjugated polymer.

Since the oligomer which is used according to the present invention has a small average degree of oligomerization of 3 to 12, it does not have large influence on the crystallinity or coagulation structure of the electron conjugated polymer and is uniformly dispersed in the electron conjugated polymer in a molecule level.

Among the oligomers, polyphenylenesulfide, polysulfone or polyphenylene oxide which has sulfonic acid groups at both chain ends and an average degree of oligomerization of 3 to 12 is aromatic and serves as a dopant which has good compatibility with the electron conjugated polymer to give a film having good mechanical properties.

Now, the ionic group-bonded particle is explained. FIGS. 1A and 1B schematically show two embodiments of the ionic group-bonded particles which are used according to the present invention, and FIG. 2 is a schematic cross sectional view of one embodiment of the electrically conducting polymer composition containing the ionic group-bonded particles dispersed therein according to the present invention.

In FIG. 1A, the sulfonic acid groups 1 ($SO_3^{31}$) are covalently bonded to the particle 2, and in FIG. 1B, the anionic groups 1' are bonded to the particle 2 and treated with molecules of the cationic surfactant 3. When such ionic group-bonded particles are dispersed in the electron conjugated polymer matrix 4 as shown in FIG. 2, the polymer composition has good heat resistance and long-time stability against the electric field.

The ionic group-bonded particles preferably comprise spherical particles having the bonded ionic groups which are made of a polycondensate of toluenesulfonic acid and aldehyde, a polycondensate of benzenesulfonic acid and aldehyde, polystyrenesulfonic acid, a polycondensate of p-oxybenzoic acid and aldehyde, a polycondensate of salicylic acid and aldehyde, polyvinylbenzylammonium and the like. The ionic group-bonded particles can be produced by grinding the polymer resin or emulsion polymerization.

The ionic group-bonded particles have an average particle size of 0.01 to 1 $\mu$m. When the average particle size is smaller than 0.01 $\mu$m, the production of the particle is difficult and the particles have characteristics similar to molecules. When the average particle size is larger than 1 $\mu$m, the particles are too large and the number of the carrier is not increased. In addition, the particles cannot form colloids in the polymerization solution and are precipitated.

Since the ionic group-bonded particle is far larger than the molecular chain of the electron conjugated polymer, the former does not have large influence on the crystallinity or orientation of the latter which is present far away from the former, so that the polymer composition has better mechanical properties.

Since the ionic dopant contained in the electrically conducting polymer composition of the present invention is hydrophilic, the conductivity of the polymer composition may be influenced by moisture. In such case, the treatment of the ionic dopant particles with a metal ion which forms a water-insoluble salt (e.g. $Ba^{2+}$ and $PB^{2+}$) will makes the polymer composition water resistant.

FIG. 3 schematically shows a cross section of the electrically conducting polymer composition containing the movable dopant 5 and the stationary dopant 6 in the matrix polymer 4. In this embodiment, the stationary dopant is preferably an ionic polymer having a molecular weight of at least 800 or ionic group-bonded particles which have an average particle size of 0.01 to 1 $\mu$m. To prevent moving of the stationary dopant by the electric field, the ionic polymer as the stationary dopant preferably has the molecular weight of at least 800.

As the movable dopant, an ionic compound having a molecular weight of not larger than 200. Specific examples of the movable dopant are electron-acceptors comprising halogens, Lewis acids and protonic acids, and electron-donors such as alkali metals, alkaline earth metals, ammonium ion and phosphonium ion. Among them, anions such as $BF_4^{31}$, $AlCl_4^-$ and $ClO_4^-$, and alkali metal ions such as $Li^+$ and $Na^+$ are preferred. When the movable dopant has a molecular weight larger than 200, it becomes too bulky so that its mobility is decreased. Although iodine is doped in the form of $I_3^-$ which has a molecular weight of 381, it is included in the movable dopant to be used according to the present invention since it acts also in the form of $I^-$.

The electron conjugated polymer to be used as the matrix polymer according to the present invention can be prepared by chemical polymerization or electrolytic polymerization (e.g. anodic oxidation polymerization or cathodic reduction polymerization). Specific examples of the electron conjugated polymer are polyphenylene, polynaphthalene, polypyrrole, polyphenylenesulfide, polythiophene, polyaniline, their derivatives, and co-polymers of two or more monomers of these polymers. In the anodic oxidation polymerization, the anionic group-bonded particles are dispersed in the monomer solution of the electron conjugated polymer in a colloidal form and the monomer is polymerized between at least one pair of electrodes to electrolytically polymerize the monomer on the anode. Thereby, the electrically conductive polymer composition, for example, as shown in FIG. 2 is produced. When both the stationary dopant and the movable dopant are used, the electrically conductive polymer composition, for example, as shown in FIG. 3 is produced. When the solution of electron conjugated monomer is a non-aqueous one, the anionic group-bonded particles are colloidally dispersed in the monomer solution in the presence of a cationic surfactant.

The electrically conducting polymer composition of the present invention may be used as an electrolytic conductor of an electrolytic capacitor which comprises a metal anode, an oxide dielectric, an electrolytic conductor and a cathode. The capacitor comprising the electrolytic conductor made of the electrically conducting polymer composition of the present invention has stability due to good heat resistance and long-time stability of the polymer composition of the present invention.

When the polymer composition of the present invention is used in a p-n junction element, the junction element has stable characteristics.

PREFERRED EMBODIMENTS OF THE INVENTION

The present invention will be illustrated by following Examples.

EXAMPLE 1

In a 200 ml separable flask, 3-methylthiophene (5 g), a polycondensate of salicylic acid and aldehyde having an average oligomerization degree of 3 (3 g) and nitrobenzene (150 ml) were charged.

Through the polymerization solution, a direct current was passed between an indium tin oxide (ITO) anode and a platinum cathode at 10 mA/cm$^2$ in a nitrogen stream to form a thin film of poly(3-methylthiophene) having a thickness of about 20 $\mu$m on the anode. Then, the thin film was peeled off from the anode.

On both ends of the thin film of poly(3-methylthiophene), a silver paint was coated to from electrodes, and the conductivity was measured. The thin film had conductivity of 7 S/cm at 25° C.

The thin film was set in an oven kept at 80° C. and a direct current electric field of 1 V/cm was applied. The change of current was measured as time passed. After 300 hours, the current was decreased by 16% from the original current. This indicates that the electrolytic polymer composition is more stable than an electrolytic polymer containing the conventional low molecular weight dopant.

EXAMPLE 2

In a 200 ml separable flask, 3-methylthiophene (5 g), polyphenylenesulfide having the sulfon groups at both chain ends and an average oligomerization degree of 6 (3 g) and nitrobenzene (150 ml) were charged.

Through the polymerization solution, a direct current was passed between an indium tin oxide (ITO) anode and a platinum cathode at 10 mA/cm$^2$ in a nitrogen stream to form a thin film of poly(3-methylthiophene) having a thickness of about 23 $\mu$m on the anode. Then, the thin film was peeled off from the anode.

On both ends of the thin film of poly(3-methylthiophene), a silver paint was coated to from electrodes, and the conductivity was measured. The thin film had conductivity of 90 S/cm at 25° C.

The thin film was set in a furnace kept at 80° C. and a direct current electric field of 0.5 A/cm was applied. The change of current was measured as time passed. After 300 hours, the current was decreased by 11% from the original current. This indicates that the electrolytic polymer composition is more stable than an electrolytic polymer containing the conventional low molecular weight dopant.

EXAMPLE 3

In a 200 ml separable flask, pyrrole (4 g), particles of a polycondensate of toluenesulfonic acid and aldehyde having an average particle size of 0.03 μm (2 g) and acetonitrile (100 ml) were charged.

Through the polymerization solution, a direct current was passed between an indium tin oxide (ITO) anode and a platinum cathode at 10 mA/cm² in a nitrogen stream to form a thin film of polypyrrole having a thickness of about 25 μm on the anode. Then, the thin film was peeled off from the anode.

On both ends of the thin film of polypyrrole, a silver paint was coated to from electrodes, and the conductivity was measured. The thin film had conductivity of 10 S/cm at 25° C.

The thin film was set in an oven kept at 80° C. and a direct current electric field of 1 V/cm was applied. The change of current was measured as time passed. After 300 hours, the current was decreased by 12% from the original current. This indicates that the electrolytic polymer composition is more stable than an electrolytic polymer containing the conventional low molecular weight dopant.

EXAMPLE 4

In a 200 ml separable flask, 3-methylthiophene (5 g), particles of polystyrenesulfonic acid having an average particle size of 0.04 μm (3 g) and nitrobenzene (150 ml) were charged.

Through the polymerization solution, a direct current was passed between an indium tin oxide (ITO) anode and a platinum cathode at 10 mA/cm² in a nitrogen stream to form a thin film of poly(3-methylthiophene) having a thickness of about 20 μm on the anode. Then, the thin film was peeled off from the anode.

On both ends of the thin film of poly(3-methylthiophene), a silver paint was coated to from electrodes, and the conductivity was measured. The thin film had conductivity of 40 S/cm at 25° C.

The thin film was set in a furnace kept at 80° C. and a direct current electric field of 0.5 V/cm was applied. The change of current was measured as time passed. After 300 hours, the current was decreased by 5% from the original current. This indicates that the electrolytic polymer composition is more stable than an electrolytic polymer containing the conventional low molecular weight dopant.

EXAMPLE 5

In a 200 ml separable flask, pyrrole (4 g), tetrabutylammonium perchlorate (1 g), particles of a polycondensate of toluenesulfonic acid and formaldehyde having an average particle size of 0.03 μm (2 g) and acetonitrile (100 ml) were charged.

In the polymerization solution, a direct current was passed between an indium tin oxide (ITO) anode and a platinum cathode at 10 mA/cm² in a nitrogen stream to form a thin film of polypyrrole having a thickness of about 35 μm on the anode. Then, the thin film was peeled off from the anode.

On both ends of the thin film of polypyrrole, a silver paint was coated to from electrodes, and the conductivity was measured. The thin film had conductivity of 300 S/cm at 25° C.

A pair of electrodes were attached to the thin film and direct current voltage of 0.3 V was applied between the electrodes to measure the current. The result is shown in FIG. 4 (the solid line 7).

In the same manner as above but using no tetrabutylammonium perchlorate, the thin film of polypyrrole was formed, and subjected to the same test as above. The results is shown in FIG. 4 (the broken line 8).

For comparison, the polypyrrole thin film containing perchloric acid as a sole dopant was subjected to the same test as above. The result is shown in FIG. 4 (the broken line 9).

The polymer thin film containing both the stationary dopant and the movable dopant had larger conductivity than the thin film containing the stationary dopant alone, and the decrease of the conductivity was small in comparison with the thin film containing the movable dopant alone.

The thin film of this Example was set in a furnace kept at 80° C. and a direct current electric field of 0.3 V/cm was applied. The change of current was measured as time passed. After 300 hours, the current was decreased by 15% from the original current. This indicates that the electrolytic polymer composition is more stable than an electrolytic polymer containing the conventional low molecular weight dopant.

EXAMPLE 6

In a 200 ml separable flask, 3-methylthiophene (5 g), tetrabutylammonium perchlorate (1 g) and particles of polystyrenesulfonic acid having an average particle size of 0.04 μm (3 g) which had been treated with a quaternary ammonium surfactant (3 g) and nitrobenzene (150 ml) were charged.

Through the polymerization solution, a direct current was passed between an indium tin oxide (ITO) anode and a platinum cathode at 20 mA/cm² in a nitrogen stream to form a thin film of poly(3-methylthiophene) having a thickness of about 35 μm on the anode. Then, the thin film was peeled off from the anode.

On both surfaces of the thin film of poly(3-methylthiophene), a silver paint was coated to from electrodes, and the conductivity was measured. The thin film had conductivity of 200 S/cm at 25° C.

The thin film was set in a furnace kept at 80° C. and a direct current electric field of 0.3 V/cm was applied. The change of current was measured as time passed. After 300 hours, the current was decreased by 8% from the original current. This indicates that the electrolytic polymer composition is more stable than an electrolytic polymer containing the conventional low molecular weight dopant.

EXAMPLE 7

On an aluminum foil having a thickness of 0.03 mm and a roughened surface, an aluminum oxide dielectric layer and then electrically conductive nuclei were formed. Then, the aluminum foil was dipped in the same polymer solution as prepared in Example 1, and the electrically conductive polymer film was formed on the oxide dielectric layer.

Then, the aluminum foil was folded with the polymer film inside, and a cathode was formed with a silver paint. After bonding lead wires, a protective resin was coated to produce a solid electrolytic capacitor. The capacitor had substantially the same capacitance as a stacked type capacitor using the low molecular weight dopant.

The frequency characteristics and the life of the solid electrolytic capacitor were measured. The frequency characteristics were improved up to the higher frequency in comparison with the capacitor containing the low molecular weight dopant, and the life was 2000 hours or longer at 125° C.

What is claimed is:

1. An electrically conducting polymer composition which comprises an electron conjugated polymer, and a stationary dopant and a movable dopant which are dispersed in said electron conjugated polymer, wherein said stationary dopant is selected from the group consisting of an ionic polymer having an average molecular weight of at least 800 and ionic group-bonded particles which have an average particle size of 0.01 to 1 μm and to at least surface of which ionic groups are bonded through covalent bonds, and said movable dopant is an ionic compound having a molecular weight of not larger than 200.

2. The electrically conducting polymer composition according to claim 1, wherein said ionic polymer is at least one selected from the group consisting of a polycondensate of toluenesulfonic acid and aldehyde, a polycondensate of benzenesulfonic acid and aldehyde, polystyrenesulfonic acid, polyphenylenesulfide, polysulfone an polyphenylene oxide each of which has sulfonic acid groups at both chain ends, a polycondensate of p-hydroxybenzoic acid and aldehyde and a polycondensate of salicylic acid and aldehyde.

3. The electrically conducting polymer composition according to claim 1, wherein said ionic group-bonded particle is at least one spherical particle made of a polymer selected from the group consisting of a polycondensate of toluenesulfonic acid and aldehyde, a polycondensate of benzenesulfonic acid and aldehyde, polystyrenesulfonic acid, a polycondensate of salicylic acid and aldehyde and polyvinyl benzylammonium.

4. A method for preparing the electrically conducting polymer composition, which comprises steps of dispersing ionic group-bonded particles which have an average particle size of 0.01 to 1 μm and to at least surfaces of which ionic groups are bonded through covalent bonds in a solution containing an electron conjugated monomer and a salt which functions as a movable dopant and has a molecular weight of not larger than 200, and applying an electric field between at least one pair of electrodes immersed in said solution to electrolytically polymerize said electron conjugated monomer on an anode.

5. The method according to claim 4, wherein said solution is a non-aqueous solution, and said ionic group-bonded particles are colloidally dispersed in said solution in the presence of a cationic surfactant.

6. The method according to claim 4, wherein said electron conjugated monomer is at least one selected from the group consisting of benzene, naphthalene, anthracene, pyrrole and diphenylamine.

7. A capacitor comprising
a metal anode,
an oxide dielectric layer on said metal anode,
an electrolytic conductor layer which is present on said oxide dielectric layer, and
a cathode on said electrolytic conductor, wherein said electrolytic conductor is formed from an electrically conducting polymer composition which comprises an electron conjugated polymer, and a stationary dopant and a movable dopant which are dispersed in said electron conjugated polymer, said stationary dopant being selected from the group consisting of an ionic polymer having an average molecular weight of at least 800 and ionic group-bonded particles which have an average particle size of 0.01 to 1 μm and to at least surface of which ionic groups are bonded through covalent bonds, and said movable dopant is an ionic compound having a molecular weight of not larger than 200.

8. An electrically conducting polymer composition which comprises an electron conjugated polymer and at least one stationary dopant consisting of ionic group-bonded particles which have an average particle size of 0.01 to 1 μm and to at least surfaces of which ionic groups are bonded through covalent bonds, and is dispersed in said electron conjugated polymer.

9. The electrically conducting polymer composition according to claim 8, wherein said ionic group-bonded particle is at least one spherical particle made of a polymer selected from the group consisting of a polycondensate of toluenesulfonic acid and aldehyde, a polycondensate of benzenesulfonic acid and aldehyde, polystyrenesulfonic acid, a polycondensate of salicylic acid and aldehyde and polyvinylbenzylammonium.

10. An electrically conducting polymer composition which comprises an electron conjugated polymer and at least one stationary dopant consisting of an oligomer having ionic groups with an average degree of oligomerization of 3 to 12, said oligomer containing the sulfonic group is at least one selected from the group consisting of a polycondensate of toluenesulfonic acid and aldehyde, a polycondensate of benzenesulfonic acid and aldehyde, and is dispersed in said electron conjugated polymer.

11. A method for preparing an electrically conducting polymer composition, which comprises steps of dispersing anionic group-bonded particles in a solution containing an electron conjugated monomer and applying an electric field between at least one pair of electrodes immersed in said solution to electrolytically polymerize said electron conjugated monomer on an anode.

12. The method according to claim 11, wherein said solution is a non-aqueous solution, and said anion group-bonded particles are colloidally dispersed in said solution in the presence of a cationic surfactant.

13. A capacitor comprising:
a metal anode,
an oxide dielectric layer on said metal anode,
an electrolytic conductor layer which is present on said oxide dielectric layer, and
a cathode on said electrolytic conductor,
wherein said electrolytic conductor is formed from an electrically conducting polymer composition which comprises an electron conjugated polymer and at least one stationary dopant consisting of ionic group-bonded particles which have an average particle size of 0.01 to 1 μm and to at least surfaces of which ionic groups are bonded through covalent bonds, and is dispersed in said electron conjugated polymer.

* * * * *